UNITED STATES PATENT OFFICE.

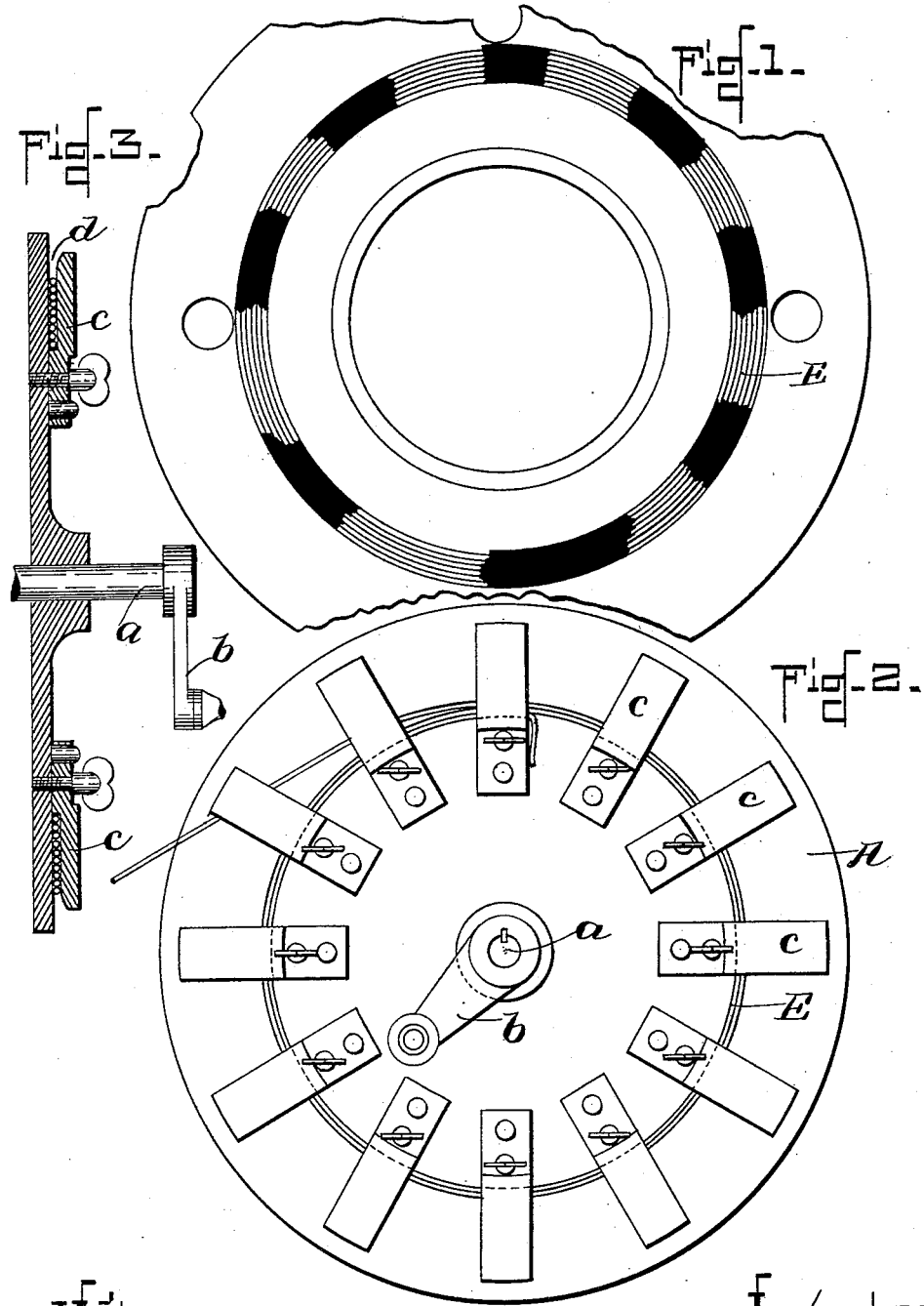

PHILIP F. LEARY, OF FALL RIVER, MASSACHUSETTS.

METALLIC GASKET.

SPECIFICATION forming part of Letters Patent No. 602,542, dated April 19, 1898.

Application filed August 24, 1897. Serial No. 649,301. (No model.)

*To all whom it may concern:*

Be it known that I, PHILIP F. LEARY, of Fall River, in the county of Bristol and State of Massachusetts, have invented certain new and useful Improvements in Metallic Gaskets, of which the following is a description sufficiently full, clear, and exact to enable those skilled in the art to which it appertains or with which it is most nearly connected to make and use the same.

My invention relates to metallic packings or gaskets, and has for its object to provide a cheap and efficient packing for flange and other joints, whereby the leakage of steam or other fluid may be prevented.

Heretofore it has been proposed to use gaskets made of concentric wire rings or coils held together by metallic cross-ties inserted in transverse grooves in the coils. Said packings, however, have proved objectionable for two reasons. First, the seams or joints between the coils and the cross-ties soon open and permit a considerable leakage of steam. In the second place only wires of comparatively large cross-section could be used, since it was not practicable to accurately groove and fit the cross-ties in the coils of fine wire. Besides, such packings were comparatively expensive because of the necessity of using the large wire as well as on account of the time and labor involved in grooving the wires and fitting the cross-ties or binders to said grooves.

My improved gasket consists of a flat ring made of wire coils held close together by means of solder or a similar binder without the use of any grooves or cross-ties whatever. It makes a perfect packing without any seam or joint whatever from the inside to the outside and can be manufactured at a very low cost.

In the drawings, Figure 1 is a plan view showing my gasket applied to the flange-joint of a steam-pipe, the heavy black portions representing the solder. Fig. 2 is a plan view of my apparatus, showing the apparatus by which I am enabled to coil the wire and hold it in place until I have firmly fastened the coils together with solder or other similar substance. Fig. 3 is a central sectional view of the same in a plane perpendicular to the plane of Fig. 2.

I will now describe my gasket and the mode of making and using the same.

In the manufacture of my gasket I employ a disk A, having a shaft or axis $a$, provided with a suitable crank $b$. On the face of this disk I secure at proper intervals a series of detachable clips $c$ in any suitable manner, the drawings showing them secured by means of thumb-screws. These clips are recessed, as shown at $d$, sufficiently to receive the coils of wire, but should not be large enough to permit the coils to overlap each other. The end of the wire to be wound is secured in any suitable manner against slipping, and the disk (the axis or shaft of which, it will be understood, is seated in any suitable bearing) is rotated until the desired number of turns or coils have been wound on. The wire is kept taut as it is fed onto the disk, so as to bring the coils close together. The number of turns taken will of course depend upon the width of the gasket which is desired.

It is obvious that by using only four clips arranged ninety degrees apart a rectangular gasket may be made, and so the form of the gasket may be varied indefinitely by changing the arrangement or number of the clips.

When I have wound on a sufficient number of coils or turns, I then proceed to solder, braze, or otherwise bind the coils together, the intervals between the clips affording easy access to the coils for that purpose, the coils being held firmly in place by the disk and its clips without resorting to any cross-ties or grooves. When the solder has hardened sufficiently, I cut the wire and remove a sufficient number of the clips to permit the removal of the gasket E.

In practice I prefer to make the gasket large enough to come just inside of the line of the bolt-holes, as shown in Fig. 1. In case the flanges are thin and easily bent I may use two gaskets, one inside and the other outside of the line of bolt-holes, thus avoiding the danger of springing the flanges when the bolts are tightened. It will therefore be clear that I secure a cheap, durable, and highly-efficient packing of very simple form. The solder fills the interstices between the adjacent coils without projecting above the surface of the ring.

As stated before, the packing-ring may be of any desired shape or width.

The wire being of uniform section throughout its length and being coiled so that the several turns of the coil lie in the same horizontal plane, there is no opportunity for leakage from the inside to the outside thereof, there being an entire absence of any transverse seam or joint.

Having thus explained the nature of the invention and described a way of constructing and using the same, though without attempting to set forth all of the forms in which it may be made or all of the modes of its use, it is declared that what is claimed is—

A metallic packing or gasket comprising a flat ring made of close coils of wire of uniform cross-section lying in the same horizontal plane, said coils being continuous and securely soldered together, whereby any transverse leakage is prevented.

In testimony whereof I have signed my name to this specification, in the presence of two subscribing witnesses, this 14th day of August, A. D. 1897.

PHILIP F. LEARY.

Witnesses:
WILLIAM E. FULLER, Jr.,
ARTHUR S. PHILLIPS.